United States Patent
Bujalski et al.

[11] Patent Number: 5,863,848
[45] Date of Patent: Jan. 26, 1999

[54] PREPARATION OF SUBSTANTIALLY CRYSTALLINE SILICON CARBIDE FIBERS FROM BOROSILAZANES

[75] Inventors: Duane Ray Bujalski, Bay City; Gregg Alan Zank; Thomas Duncan Barnard, both of Midland, all of Mich.

[73] Assignee: Dow Corning Corporation, Midland, Mich.

[21] Appl. No.: 772,384

[22] Filed: Sep. 27, 1991

[51] Int. Cl.⁶ .................................................. C04B 35/565
[52] U.S. Cl. .......................... 501/88; 501/95.1; 423/345
[58] Field of Search .............................. 528/517; 501/88, 501/95, 95.1; 423/345

[56] References Cited

U.S. PATENT DOCUMENTS

| | | | |
|---|---|---|---|
| 4,052,430 | 10/1977 | Yajima | 260/448.2 |
| 4,100,233 | 7/1978 | Yajima | 423/345 |
| 4,482,689 | 11/1984 | Haluska | 528/25 |
| 4,550,151 | 10/1985 | Takamizawa | 528/7 |
| 4,604,367 | 8/1986 | Takamizawa | 501/95 |
| 4,910,173 | 3/1990 | Niebylski | 501/97 |
| 4,921,925 | 5/1990 | Niebylski | 528/5 |
| 5,030,744 | 7/1991 | Fanayama et al. | 556/402 |
| 5,032,551 | 7/1991 | Tashiro et al. | 501/95 |
| 5,043,045 | 8/1991 | Chassagneux et al. | 156/663 |
| 5,045,399 | 9/1991 | Niebylski | 428/447 |
| 5,071,600 | 12/1991 | Deleeuw et al. | 264/22 |
| 5,128,286 | 7/1992 | Funayama et al. | 501/97 |

FOREIGN PATENT DOCUMENTS

| | | |
|---|---|---|
| 325483 | 7/1989 | European Pat. Off. . |
| 0364323 | 4/1990 | European Pat. Off. . |
| 3500962 | 7/1985 | Germany . |
| 284437 | 3/1990 | Japan . |

OTHER PUBLICATIONS

Mah et al., J. Mat. Sci. 19, 1191–1201 (1984).
"International Symposium . . . " Abstracts, pp. 95–96 (1990).
Seyferth et al., J. Am. Ceram. Soc. 73, 2131–2133 (1990).
Noth, Anorg. Chem. Org. Chem., 16 (9) 618–621 (1961).

*Primary Examiner*—Ngoclan Mai
*Attorney, Agent, or Firm*—Roger E. Gobrogge; Sharon K. Severance

[57] ABSTRACT

This invention relates to the preparation of thermally stable, substantially polycrystalline silicon carbide ceramic fibers using borosilazane resins. The method comprises spinning fibers from the resin, infusibilizing the spun fibers and pyrolyzing the spun fibers at a temperature greater than about 1700° C.

20 Claims, No Drawings

5,863,848

PREPARATION OF SUBSTANTIALLY CRYSTALLINE SILICON CARBIDE FIBERS FROM BOROSILAZANES

This invention was made with US Government support under Contract No.NAS3-26131 awarded by the National Aeronautics and Space Administration. The Government has certain rights in the invention.

BACKGROUND OF THE INVENTION

This invention relates to the preparation of thermally stable, substantially polycrystalline silicon carbide ceramic fibers using borosilazane resins. The method described herein provides a simple yet effective method of preparing desirable fiber at a relatively low cost.

Silicon carbide ceramic fibers are known in the art for their mechanical strength at high temperatures. Because of this property, they have found utility in numerous areas such as reinforcement for plastic, ceramic or metal matrices to produce high performance composite materials or the formation of fibrous products such as high temperature insulation, belting, gaskets and curtains.

Several methods have been developed to manufacture such fibers. For instance, it is known that organosilicon polymers may be spun into fibers, infusibilized (cured) and pyrolyzed at elevated temperatures to form a ceramified fiber. Unfortunately, this method suffers from the disadvantage that substantial amounts of oxygen and/or nitrogen are often incorporated into the fibers either directly through the polymer or indirectly by incorporation during spinning, infusibilization or ceramification. When these fibers are heated to temperatures above 1400° C., the oxygen and nitrogen is lost causing weight loss, porosity and decreased tensile strength.

Recently, polycarbosilane preceramic polymers having a Si-C skeletal structure have been used to minimize the incorporation of nitrogen and oxygen. Yajima et al. in U.S. Pat. Nos. 4,052,430 and 4,100,233, for example, teach a method of producing silicon carbide fibers by spinning, infusibilizing and pyrolyzing various polycarbosilanes. Nippon Carbon Co., moreover, utilizes this technology to produce a SiC ceramic fiber sold under the trade name NICA-LON™. These fibers too, however, are known to contain about 9–15% oxygen and, thus, degrade at temperatures as low as 1200° C. (see Mah et al., J. Mat. Sci. 19, 1191–1201 (1984)

Borosilazanes are also known in the art. For instance, Japanese Kokai Patent No. Hei 2-84437 describes the formation of borosilazanes by reacting a silazane with a boron compound. The reference describes the resultant materials as useful in the formation of ceramics. In "International Symposium on Organosilicon Chemistry Directed Towards Material Science", Abstracts, P. 95–96, Sendai, Japan, 25–29 Mar. (1990), the same inventors describe the use of these materials in the formation of fibers. However, since the fibers contained insufficient carbon and were only pyrolyzed up to 1700° C., the resultant product is described as an amorphous silicon boron nitride fiber. The fibers claimed in the present application, on the other hand, are predominantly crystalline, silicon carbide.

European Patent No. 364,323 describes a method of forming polymers based on boron and nitrogen comprising reacting a silazane with a trihalogen borane. The resultant materials are taught therein as being useful in the formation of boron nitride ceramics, including fibers.

Takamizawa et al. in U.S. Pat. No. 4,604,367 teach the preparation of an organoborosilicon polymer by mixing an organopolysilane with an organoborazine compound, spinning fibers and then ceramifying the fibers by heating to temperatures in the range of 900°–1800° C. The organoborosilicon polymer therein, however, is described as having a skeletal structure comprising Si, C, N and B compared to the Si, B and N chains of the present invention. Moreover, this reference teaches that the tensile strength of the fibers drops off dramatically when heated above 1500° C. (note the graph on the cover of the reference)

U.S. Pat. No. 4,910,173 granted to Niebylski describes the formation of organoborosilazane polymers by the reaction of a polysilazane with a boroxine. The reference states that the resultant materials are useful in the formation of ceramic fibers but fails to teach the methodology.

Seyferth et al., J. Am. Ceram. Soc. 73, 2131–2133 (1990) likewise teach the formation of borosilazane polymers by the reaction of silazanes with boranes. The reference teaches that the resultant materials are useful in the production of borosilicon nitride ceramic fibers.

The present inventors have now unexpectedly found that thermally stable, substantially polycrystalline SiC fibers can be formed by firing borosilazane fibers having greater than about 0.2% boron and greater than about 0.1% free carbon incorporated therein to a temperature greater than about 1700° C.

SUMMARY OF THE INVENTION

The present invention relates to a method for the preparation of thermally stable, substantially polycrystalline silicon carbide fibers. The method comprises forming a fiber from a preceramic borosilazane resin characterized by containing at least about 0.2% by weight boron and by its ceramic char containing at least about 0.1% free carbon. The fiber is infusibilized to render it non-melting and then pyrolyzed at a temperature greater than about 1700° C. in a non-oxidizing environment.

The present invention also relates to silicon carbide fibers which have at least 75% crystallinity, a density of at least about 2.9 gm/cc, a very low residual oxygen content and which contain greater than 1 weight percent nitrogen.

DETAILED DESCRIPTION OF THE INVENTION

The present invention is based on the discovery that borosilazane polymers which have at least about 0.2% by weight boron and at least about 0.1% by weight free carbon incorporated therein can be used to form substantially polycrystalline SiC fibers which retain their strength at high temperatures. These fibers have at least 75% crystallinity, a density of at least about 2.9 gm/cc and a very low residual oxygen content.

The borosilazanes used in the present invention are especially valuable precursors for such fibers since they are relatively simple and inexpensive to manufacture and can be modified to produce a char with nearly any desired stoichiometry. In addition, the use of these polymers assures a uniform distribution of boron throughout the fibers. Such uniformity avoids the boron agglomeration flaws which may occur when boron is incorporated into the fibers by other methods.

The borosilazanes useful herein are generally well known in the art and can comprise any which provide sufficient boron and carbon on pyrolysis. These can include, for instance, those described in U.S. Pat. No. 4,910,173 granted to Niebylski, those described by Funayama et al., International Symposium on Organosilicon Chemistry Directed Towards Material Science, Abstracts, P. 95–96, Sendai, Japan, 25–29 Mar. (1990), those described by Seyferth et al., J. Am. Ceram. Soc. 73, 2131–2133 (1990), those described by Noth, B. Anorg. Chem. Org. Chem., 16(9), 618–21, (1961), those described by Araud et al. in European Patent No. 364,323 and those described by Funayama et al. in Japanese Kokai Patent No. 2-84437 which are all incorporated herein by reference in their entirety.

The method for preparing such compounds is likewise known in the art and described in the above references. The preferred method, however, comprises reacting a boron trihalide with a silazane oligomer such as $(RSi(NH)_{1.5})_x$ or $((CH_3)3Si)_2NH$, wherein R is selected from the croup consisting of hydrogen, a hydrocarbon radical and a substituted hydrocarbon radical and x is an integer of 2–20. Examples of the R groups include alkyls such as methyl, ethyl, propyl, butyl, etc., alkenyls such as allyl, vinyl, etc., and saturated or unsaturated cyclic groups such a cyclopentane, cyclohexane, cycloheptane, phenyl, etc. Especially preferred are hydrocarbons with 1–6 carbon atoms with methyl being most preferred. If boron tribromide is to be used in this process, the amount of the silazane oligomer should be greater than 2.7 equivalents to avoid gelation. Since such gelation may be a potential problem with the use of boron tribromide, it is more preferred to use boron trichloride. Other equivalent methods, however, are also contemplated herein. Specific methods for preparation of suitable borosilazanes are also illustrated in the examples.

The specific polymer chosen should be one which contains at least about 0.2 weight percent boron based on the total weight of the polymer. This amount of boron is necessary for the fibers to undergo a densification process which decreases porosity and strengthens the fiber. Polymers containing at least about 0.6% by weight are more preferred for this effect.

The specific polymer chosen should also yield a ceramic char in which at least about 0.1% free carbon is generated. Preferably, the polymer should yield a char having between about 0.1 and about 5 weight percent free carbon. What is meant by free carbon in this invention is the amount of free or excess carbon derived from the borosilazane during pyrolysis. The total amount of carbon in the ceramic char equals the amount of free or excess carbon plus the amount of carbon combined with silicon in the form of silicon carbide.

The amount of free carbon derived from the borosilazane is determined by pyrolysis of the borosilazane to an elevated temperature under an inert atmosphere until a stable ceramic char is obtained. For purposes of this invention, a "stable ceramic char" is defined as the ceramic char produced under an inert atmosphere at an elevated temperature which will not significantly decrease in weight upon further exposure at the elevated temperature. Normally, a stable ceramic char is produced upon pyrolysis at 1800° C. for about 30 minutes under argon. Other elevated temperatures can be used to form the stable ceramic char but the length of exposure to the elevated temperature will need to be increased for temperatures less than 1800° C. Both the ceramic yield and the silicon and carbon content of the stable ceramic char are then determined. Using a rule of mixtures, the amount of SiC and free carbon of the stable ceramic char can be calculated.

To be useful herein, the borosilazane should also preferably be 1) solid at room temperature, 2) readily spinable into small diameter fibers, and 3) infusible such that the polymer will remain in fiber form during pyrolysis. More preferably, I) the solid polymers have softening points less than about 100° C. so that they are readily extrudable for conventional fiber spinning techniques and II) the polymers have Si—H functional groups for faster cure rates.

Alternatively, a liquid borosilazane may be utilized to spin the fibers. However, when fibers are spun in this manner, they are generally solidified by rapid curing immediately after exiting the spinning apparatus.

The borosilazanes may, however, be formed into fibers by any conventional spinning technique. For instance, techniques such as melt spinning, dry spinning or wet spinning may all be used in the practice of this invention.

The spun fibers formed in this manner are generally drawn to diameters of less than about 100 micrometers. More preferably, the fibers are drawn to diameters of about 10–50 micrometers. Fibers of this size are generally more flexible than larger fibers and, thus, can be more readily woven into reinforcing matrices for composite materials.

The fibers formed above are then infusibilized to prevent melting during pyrolysis. The fibers may be infusibilized, for example, by exposure to various gases such as HCl, HCl/moist air, HCl/ammonia, boron trichloride/ammonia, borane or chlorine/ammonia. The concentration of HCl used is generally in the range of about 0.1 to about 50 weight percent, the concentration of water is generally in the range of about 0.1 to about 20 weight percent, the concentration of ammonia gas is in the range of 0.1 to 50 weight percent, the concentration of boron trichloride is in the range of 0.1 to 20 weight percent, the concentration of borane is in the range of 0.01 to 20 weight percent, and the concentration of chlorine gas is in the range of 0.1 to 50 weight percent. Generally, the fibers are cured at temperatures in the range of about room temperature to about 400° C. in a time of from about less than a second to several hours. For example, times of from about 0.1 second to about 6 hours may be used.

If enough boron is not incorporated into the initial polymer, additional boron may be incorporated into the fibers during infusibilization or the early stages of pyrolysis. This can be accomplished, for instance, by exposing the fiber to a boron containing gas such as diborane, a boron halide, diborane, boron hydrides, borazine and/or trichloroborazine.

After infusibilization, the fibers are pyrolyzed by heating to temperatures greater than about 1700° C., and preferably at temperatures of about 1800°–1900° C. in a non-oxidizing environment (eg., argon, vacuum, etc.). The present inventors have found that most of the oxygen and nitrogen are eliminated from the fibers at temperatures above about 1400° C. which is believed to result in an initial weakening of the fiber. However, when an appropriate amount of boron is incorporated into fibers and said fibers are pyrolyzed above about 1700° C., it is believed the fibers undergo a densification process which decreases porosity and strengthens the fiber. Temperatures in excess of about 2000° C. are not preferred as there is undesirable grain size growth of the silicon carbide ceramic which adversely affects fiber strength.

The fibers are heated at the desired temperature for a time sufficient to reduce the oxygen content of the fibers to below about 0.5% by weight. For example, if the fibers are heated to about 1800° C., it has been found that temperature should be maintained for about 1 hour.

During this pyrolysis step, the nitrogen content of the fiber is also lowered. However, since some residual amounts of nitrogen (i.e., up to about 3 weight percent) typically remain in the fibers, it is postulated that a portion of the boron is present as boron nitride.

The ceramic fibers which result from the process of this invention have at least 75% crystallinity and have a density of at least about 2.9 gm/cc, which represents about 90–95% of the theoretical density of SiC. The fibers also have a smooth surface structure and a grain size less than 0.5 micrometers, typically less than 0.2 micrometers. Virtually all of the oxygen originally present in, or introduced into, the fibers is removed by the high temperature pyrolysis step and the nitrogen, other than that present as boron nitride, is also lost. Less than about 0.5%, and preferably less than about 0.2%, by weight oxygen remains and generally less than about 3% nitrogen remains.

The following non-limiting examples are included in order that one skilled in the art may more readily understand the invention.

In the following examples, Ph=phenyl, Me=Methyl and HMDZ=hexamethyldisilazane.

Carbon and nitrogen analyses were carried out on a CEC 240-XA elemental analyzer. Silicon and boron were determined by a fusion technique which consisted of converting the material to soluble forms of silicon and boron and analyzing the solute for total silicon or boron by atomic absorption spectrometry.

Gel permeation chromatography (GPC) data were obtained on a Waters GPC equipped with a model 600E systems controller, a model 490 UV and model 410 Differential Defractometer detectors; all values are relative to polystyrene.

All furnace firings were done in a 2 inch Lindberg tube furnace, a two inch Astro furnace, or a six inch Vacuum Industries hot press on graphite foil fiber holders.

EXAMPLE 1

$(PhSi(NH)_{1.5})_{0.35}(MeSi(NH)_{1.5})_{0.55}(B(NH)_{1.5})_{0.1}$

A. Polymer Synthesis

HMDZ, 362.25 g (2.25 moles), and xylene, 100 g, were placed in a 1 L three necked flask under an argon atmosphere. The flask was fitted with an addition funnel, an overhead stirrer and the argon inlet. The addition funnel was charged with 74 g (0.35 mole) of $PhSiCl_3$ and 82.2 g (0.55 mole) of $MeSiCl_3$ under argon. The chlorosilane mixture was then added to the HMDZ solution dropwise over a 30 minute period with stirring. The addition funnel was replaced with a water cooled condenser and the reaction refluxed at 80° C. for 20 hours. The mixture was then cooled to ambient temperature and the condenser replaced with a rubber septum. $BBr_3$ was added (24.8 g, 0.1 mole) via a syringe through the septum over a 10 minute period. This addition resulted in an exotherm and the formation of a milky white suspension. After stirring for 2 hours at ambient temperature, the septum was replaced with a distillation head and the mixture heated to 170° C. over 145 minutes with overhead volatiles beginning at 70° C. The warm resin was then quenched with xylene (100 g) and the resulting solution was heated to 215° C. and held for 45 minutes. The warm resin was again quenched with 100 g xylene, allowed to cool and filtered through a medium glass frit. The filtrate was placed in a 500 mL three necked flask fitted with an argon inlet, overhead stirrer and a distillation head connected to a receiver which was cooled in dry ice. The filtrate was stripped for 90 minutes at 235° C. at 10 mm Hg. The above synthesis yielded 103 g of a brittle resin which is characterized in Table 2.

B. Fiber Spinning

The above resin (5.9 g) was powdered, using a mortar and pestle, and pressed into a spinning evaluation rod using 300 psi in a stainless steel rod mold. The rod sample was loaded into an Ultraspin apparatus. This apparatus heated the polymer and mechanically fed controlled, small amounts of molten polymer through a small diameter orifice. Once extruded, the filament fell through a draw down zone in which the atmosphere was controlled to allow the option of introducing and removing cure gases. The filaments were collected on a drum rotated at a controlled speed located in an inert take-up chamber.

Fibers were spun at varying temperatures, extrusion rates and take-up speeds. Spinning conditions of 142° C., extrusion rate of 5 0.0136 g/min and take-up speed of 40 m/min resulted in spinning 19 micron diameter fibers. Spinning conditions of 142° C., extrusion rate of 0.0136 g/min and take-up speed of 70 m/min resulted in spinning 14 micron diameter fibers. Spinning conditions of 141° C., extrusion rate of 0.0208 g/min, take-up speed of 40 m/min, and 10% flow of HCl gas into and out of the draw down zone resulted in spinning 24 micron diameter fibers.

C. Batch Curing

I. Portions of fiber spun by the above technique (20–80 mg; 142° C., extrusion rate of 0.0136 g/min and take-up speed of 40 m/min) were cured in a sealed chamber designed to allow inert transfer and mounting of the fiber samples. The fiber sample was mounted in the chamber and the desired cure gas(s) admitted through a stopcock. The cured fibers were then pyrolyzed at the desired temperature. The following cure/pyrolysis conditions were used:

i) 60 mg of the fiber was exposed to 20% HCl for 10 minutes and then pyrolyzed at 3° C./min to 1200° C. under argon. The fiber retained its shape.

ii) 108 mg of the fiber was exposed to 20% HCl for 10 minutes and then 10% moist air for 5 minutes. The sample was then pyrolyzed at 3° C./min to 1200° C. under argon (46.7% yield). The fiber retained its shape and had a tensile strength of 38 ksi.

iii) 30 mg of the fiber was exposed to 20% $Cl_2$ for 18 hours and then pyrolyzed at 0.75° C./min to 200° C. under 50%ammonia/50%nitrogen, 1.7° C./min to 800° C. under argon, and 3° C./min to 1200° C. under argon. The fiber retained its shape and had a tensile strength of 31 ksi.

iv) 26 mg of the fiber was exposed to 0.2% borane and pyrolyzed at 1° C./min to 200° C. (held at 75° C. for 45 min) and then at 3° C./min to 1200° C. under argon (60.4% yield). The fiber retained its shape and had a tensile strength of 65 ksi.

v) 30 mg of the fiber was exposed to 5% $BCl_3$ for 10 minutes, exposed to 50%ammonia/50%nitrogen while pyrolyzed at 0.75° C./min to 150° C., pyrolyzed at 0.75° C./min under nitrogen to 200° C., pyrolyzed at 1.7° C./min to 800° C. under argon, and 3° C./min to 1200° C. under argon. The fiber retained its shape and had a tensile strength of 44 ksi.

II. Portions of the on line HCl exposed fibers (141° C., extrusion rate of 0.0208 g/min, take-up speed of 40 m/min, and 10% flow of HCl gas into and out of the draw down zone) were batch exposed to 10% moist air for 5 minutes and pyrolyzed at 3° C./min to 1200, 1800, 1900, and 200° C. under argon. The results are summarized in the following table.

TABLE 1

| Temp(°C.) | Char Yield | Carbon | Nitrogen | Result |
|---|---|---|---|---|
| 1200 | NA | NA | NA | Shape retention 123 ksi |
| 1800 | 36.1 wt % | 36.7 wt % | 2.2 wt % | beta-SiC |
| 1900 | 36.8 wt % | 36.4 wt % | 1.1 wt % | beta-SiC |
| 2000 | 36.4 wt % | 45.3 wt % | 0.1 wt % | beta-SiC |
| 2000 | 36.4 wt % | 35.6 wt % | 1.4 wt % | beta-SiC **** |

**** uncured borosilazane polymer
NA = Not Available

EXAMPLE 2

$(PhSi(NH)_{1.5})_{0.25}(MeSi(NH)_{1.5})_{0.65}(B(NH)_{0.15})_{0.1}$

A. Polymer Synthesis

The polymer was formed in the same manner as example 1 except the reactants comprised 435 g (2.7 mole) of HMDZ, 53 g (0.25 mole) PhSiCl₃, 97 g (0.65 mole) MeSiCl₃, and 24.8 g (0.1 mole) BBr₃. The resultant product is characterized in Table 2.

B. Fiber Spinning

The above resin (5.7 g) was powdered, using a mortar and pestle, and pressed into a spinning evaluation rod using 300 psi in a stainless steel rod mold. The rod sample was loaded into the Ultraspin apparatus of Example 1. Fibers were spun at varying temperatures, extrusion rates and take-up speeds. Spinning conditions of 143° C., extrusion rate of 0.0208 g/min and take-up speed of 40 m/min resulted in spinning 0.1 g 24 micron diameter fibers. Spinning conditions of 143 0C., extrusion rate of 0.0154 g/min, take-up speed of 40 m/min and 10% flow of HCl gas into and out of the draw down zone resulted in spinning 0.4 g of 22 micron diameter fibers.

C. Curing i. Portions of the on line HCl exposed fibers (143° C., extrusion rate of 0.0154 g/min, take-tip speed of 40 m/min, and 10% flow of HCl gas into and out of the draw down zone) were batch exposed to 10% moist air for 8 minutes and pyrolyzed at 3° C./min to 1200° C. under nitrogen to yield a fiber that retained its shape and had 58.3 wt % yield.

ii. Portions of the on line HCl exposed fibers (1430° C., extrusion rate of 0.0154 g/min, take-up speed of 40 m/min, and 10% flow of HCl gas into and out of the draw down zone) were batch exposed to 10% moist air for 8 minutes and pyrolyzed at 3° C./min to 1200° C. and 10° C./min to 1800° C. under argon to yield a fiber that retained its shape and had 34.2 wt % yield.

iii. Portions of the on line HCl exposed fibers (143° C., extrusion rate of 0.0154 g/min, take-up speed of 40 m/min, and 10% flow of HCl gas into and out of the draw down zone) were pyrolyzed at 3° C./min to 1200° C. under nitrogen to yield a fiber that retained its shape, had 61.7 wt % yield and tensile strength of 81 ksi.

TABLE 2

Characterization of borosilazanes

| Ex No | Tg °C. | Mn | Mw | Char Yield | Wt % C | Wt % N | Wt % B | Wt % Si |
|---|---|---|---|---|---|---|---|---|
| 1 | 77 | 1468 | 8590 | 36.4 | 35.6 | 1.37 | 2.3 | 57.9 |
| 2 | 79 | 1772 | 10974 | 37.1 | 32.7 | 0.8 | | |

EXAMPLE 3

$(PhSi(NH)_{1.5})_{0.30}(HSi(NH)_{1.5})_{0.60}(B(NH)_{1.5})_{0.1}$

A. Polymer Synthesis

HMDZ, 3864.0 g (24.0 moles) was placed in a 12 L four necked flask under an argon atmosphere. The flask was fitted with an addition funnel, an overhead stirrer and the argon inlet. The addition funnel was charged with 634.1 g (3.0 moles) of PhSiCl₃. The chlorosilane was then added to the HMDZ dropwise over a 30 minute period with stirring. The addition funnel was replaced with a water cooled condenser and the reaction refluxed at 90° C. for 60 hours. The mixture was then cooled to ambient temperature and the condenser replaced with an addition funnel and a solution of 813.2 g (6.0 moles) HSiCl₃ in 501 g xylene was added over a 30 minute period. BCl₃ was added (117.4 g, 1.0 mole) then added to the mixture over a 45 minute period. This addition resulted in an exotherm and the formation of a milky white suspension. After stirring for 20 hours at ambient temperature, the addition funnel was replaced with a distillation head and the reaction heated to 190° C. over 7 hours with overhead volatiles beginning at 70° C. The warm resin was then quenched with xylene (1000 g) and the resulting solution was filtered through a medium glass frit. The filtrate was filtered, bodied and stripped to yield the final product. This product had a Tg of 82° C., Mn of 1822, Mw of 6260, char yield (at 2000° C.) of 45.3 weight percent and the following chemical composition: C=34 weight percent, N=0.21 weight percent and SiH=0.123 weight percent.

B. Fiber Spinning

The above resin was melted and mechanically fed through a multifilament spinning apparatus having 200 14 mM diameter orifices. The molten polymer was fed at 2.5 g/min and pulled down approximately 12 feet to a take up spool affording a 200 filament tow. Over the course of the 12 feet, some of the fibers were exposed to HCl followed by moist inert gas. 35 micron cured and uncured fibers were thus produced.

C. Curing and Pyrolysis

I. Portions of the uncured fiber spun by the above technique were cured in a sealed chamber by exposure to HCl, BCl₃ or Cl₂ followed by exposure to ammonia. The cured fibers were then pyrolyzed in 2 steps—first to 1200° C. and then to 1800° C. The following table provides the results:

TABLE 3

| Cure | Post Treat* | Char Yield | Tensile Strength |
|---|---|---|---|
| 1% HCl/NH₃ | yes | 47.4 | 99 ksi |
| 1% HCl/NH₃ | no | 33.4 | 21 ksi |
| 2% BCl₃/NH₃ | yes | 49.7 | 100 ksi |
| 2% Cl₂/NH₃ | yes | 22.3 | — |

*-heated to 200° C. at 0.75° C./min under argon

II. Portions of the on line HCl exposed fibers were post cured at 1.1° C./min to 200° C. under vacuum (A) or at 0.75° C./min to 200° C. under vacuum. The post cured samples were pyrolyzed under argon in either a one step or 2-step process. All of the fibers retained their shape. The results are summarized in the following table:

TABLE 4

| % HCl | % H$_2$O | Post Cure | Pyrolysis type/temp | Char Yield | % C/% N | Tensile Strength |
|---|---|---|---|---|---|---|
| 1.8 | 1.8 | A | 1 step/1800 | 45.6 | 28.9/1.25 | — |
| 3.0 | 1.8 | A | 1 step/1800 | 48.1 | 29.7/4.12 | — |
| 4.5 | 1.8 | B | 1 step/1200 | 72.7 | NA | 270 ksi |
| 4.5 | 1.8 | B | 2 step/1800 | 48.5 | 33.8/0.36 | 75 ksi* |
| 4.5 | 1.8 | B | 2 step/1800 | 43.7 | 34.4/1.61 | — |
| 4.5 | 1.8 | A | 1 step/1800 | 40.9 | 27.5/0.17 | 118 ksi |

*98 weight percent beta SiC by x-ray diffraction

That which is claimed is:

1. A process for the preparation of substantially polycrystalline silicon carbide fibers comprising:
   forming fibers from a preceramic polymer comprising a borosilazane resin characterized by containing at least about 0.2% by weight boron and by its ceramic char containing at least about 0.1% by weight free carbon;
   infusibilizing said fibers; and
   pyrolyzing said fibers at a temperature greater than about 1700° C. in a nonoxidizing environment.

2. The process of claim 1 wherein the borosilazane is prepared by reacting a boron trihalide with a silazane oligomer selected from the group consisting of (RSi(NH)$_{1.5}$)$_x$ and ((CH$_3$)$_3$Si)$_2$NH, wherein R is selected from the group consisting of hydrogen, a hydrocarbon radical and a substituted hydrocarbon radical and x is an integer of 2–20.

3. The process of claim 2 wherein the boron trihalide is boron trichloride.

4. The process of claim 1 wherein the borosilazane contains Si—H units.

5. The process of claim 1 in which said substantially polycrystalline silicon carbide fibers have at least about 75% crystallinity and a density of at least about 2.9 g/cc.

6. The process of claim 1 wherein the fibers have a crystalline grain size less than 0.5 micrometers.

7. The process of claim 1 in which said fibers are formed by a spinning method selected from the group consisting of melt spinning, wet spinning and dry spinning.

8. The process of claim 1 in which said fibers are infusibilized by a method selected from the group consisting of exposure to HCl, HCl followed by moist air, HCl followed by ammonia, boron trichloride followed by ammonia, borane and chlorine followed by ammonia.

9. The process of claim 8 wherein the fibers are infusibilized at temperatures in the range of about room temperature up to about 400° C. in a time in the range of about 0.1 second up to about 6 hours.

10. The process of claim 1 in which the fibers are pyrolyzed to a temperature in the range of about 1800° C. to about 1900° C. for about 1 hour in an atmosphere selected from the group consisting of argon, helium and mixtures thereof.

11. The process of claim 1 additionally comprising incorporating boron into the fibers during infusibilization or the early stages of pyrolysis by exposure to a boron containing gas.

12. The process of claim 1 wherein the borosilazane has at least about 0.6% by weight boron incorporated therein.

13. The process of claim 1 wherein the borosilazane has between about 0.1 and about 5% by weight free carbon incorporated therein.

14. The process of claim 1 wherein the fibers are drawn to diameters of about 10–50 micrometers.

15. A method of infusibilizing borosilazane fibers comprising exposing the fibers to an atmosphere comprising gases selected from the group consisting of HCl, HCl followed by water, HCl followed by ammonia, boron trichloride followed by ammonia, borane, and chlorine followed by ammonia.

16. The method of claim 15 wherein the concentration of HCl gas is in the range of 0.1 to 50 weight percent, the concentration of water is in the range of 0.1 to 20 weight percent, the concentration of ammonia gas is-in the range of 0.1 to 50 weight percent, the concentration of boron trichloride is in the range of 0.1 to 20 weight percent, the concentration of borane is in the range of 0.01 to 20 weight percent, and the concentration of chlorine gas is in the range of 0.1 to 50 weight percent.

17. The process of claim 16 wherein the fibers are infusibilized at temperatures in the range of about room temperature up to about 400° C. in a time in the range of from about 0.1 seconds to about 6 hours.

18. Substantially polycrystalline silicon carbide fibers having at least about 75% crystallinity, a density of at least about 2.9 g/cc, less than about 0.5% by weight oxygen and a nitrogen content of greater than 1 weight percent nitrogen.

19. The fibers of claim 18 having a diameter in the range of about 10–50 micrometers.

20. The fibers of claim 18 having a grain size less than 0.5 micrometers.

* * * * *